US009331909B2

(12) United States Patent
Herrera Van Der Nood et al.

(10) Patent No.: US 9,331,909 B2
(45) Date of Patent: May 3, 2016

(54) SYSTEM AND METHOD FOR HANDLING A CONFIGURATION REQUEST

(75) Inventors: Manuel Herrera Van Der Nood, Hellevoetsluis (NL); Bernardus Hillen, Zoetermeer (NL)

(73) Assignees: Koninklijke KPN N.V., The Hague (NL); Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 202 days.

(21) Appl. No.: 13/636,177
(22) PCT Filed: Mar. 21, 2011
(86) PCT No.: PCT/EP2011/054256
§ 371 (c)(1),
(2), (4) Date: Sep. 20, 2012
(87) PCT Pub. No.: WO2011/117193
PCT Pub. Date: Sep. 29, 2011

(65) Prior Publication Data
US 2013/0013752 A1     Jan. 10, 2013

(30) Foreign Application Priority Data
Mar. 22, 2010 (EP) .................................. 10157252

(51) Int. Cl.
  *G06F 15/177* (2006.01)
  *H04L 12/24* (2006.01)
  *H04L 12/803* (2013.01)
(52) U.S. Cl.
  CPC ........ *H04L 41/0889* (2013.01); *H04L 41/0886* (2013.01); *H04L 47/125* (2013.01)
(58) Field of Classification Search
  CPC ............ H04L 41/0853; H04L 41/0806; H04L 41/0804; H04L 41/0803; H04L 41/0856; H04L 47/125; H04L 41/0889; H04L 41/0886
  USPC .......................................... 709/220; 370/254
  See application file for complete search history.

(56) References Cited

U.S. PATENT DOCUMENTS

| 5,852,722 A | 12/1998 | Hamilton |
| 6,643,690 B2 | 11/2003 | Duursma |

(Continued)

FOREIGN PATENT DOCUMENTS

| CN | 1968166 A | 5/2007 |
| CN | 101674322 | 3/2010 |

(Continued)

OTHER PUBLICATIONS

Turner 2WIRE J R et al., "Model for Auto-Provisioning CPE; draft-turner-adslmib-cpeautoconf-00.txt", IETF Standard-Working Draft, Internet Engineering Task Force, IETF, Oct. 22, 2009, pp. 1-29.

(Continued)

*Primary Examiner* — Thu Ha Nguyen
(74) *Attorney, Agent, or Firm* — McDonnell Boehnen Hulbert & Berghoff LLP (57) ABSTRACT

The invention relates to a system, device and method for handling a configuration request. The system comprises a plurality of auto-configuration servers and an auto-configuration server management device communicatively coupled to the plurality of auto-configuration servers. The auto-configuration server management device is arranged for communication over the network with a manageable electronic device, and is arranged for receiving the configuration request from the manageable electronic device. One or more auto-configuration servers that can handle the configuration request are identified based on the identification of the manageable electronic device. The load of the one or more identified auto-configuration servers is analyzed, and based on the load analysis, an auto-configuration server is selected as destination address for the configuration request. The invention improves the configuration of customer premises devices.

16 Claims, 4 Drawing Sheets

(56) References Cited

U.S. PATENT DOCUMENTS

| | | | |
|---|---|---|---|
| 6,708,221 B1 | 3/2004 | Mendez | |
| 6,928,481 B1 | 8/2005 | Harris | |
| 7,080,141 B1* | 7/2006 | Baekelmans et al. | 709/224 |
| 7,085,814 B1* | 8/2006 | Gandhi et al. | 709/208 |
| 7,321,926 B1* | 1/2008 | Zhang et al. | 709/220 |
| 7,379,984 B1* | 5/2008 | Green | 709/220 |
| 7,406,524 B2* | 7/2008 | Sadot et al. | 709/227 |
| 7,580,367 B2 | 8/2009 | Bleckert | |
| 7,584,262 B1* | 9/2009 | Wang et al. | 709/217 |
| 7,657,618 B1* | 2/2010 | Rothstein et al. | 709/223 |
| 7,844,839 B2* | 11/2010 | Palmer et al. | 713/300 |
| 7,912,954 B1* | 3/2011 | Oesterreicher et al. | 709/226 |
| 8,051,171 B2* | 11/2011 | Batni et al. | 709/226 |
| 8,135,824 B2* | 3/2012 | Saha et al. | 709/224 |
| 8,233,486 B2 | 7/2012 | Phuah et al. | |
| 8,291,046 B2* | 10/2012 | Farber et al. | 709/219 |
| 8,549,114 B2* | 10/2013 | Reddy et al. | 709/221 |
| 8,555,350 B1* | 10/2013 | Shatzkamer et al. | 726/5 |
| 8,566,437 B2* | 10/2013 | Kamenetsky et al. | 709/223 |
| 8,566,439 B2* | 10/2013 | Saha et al. | 709/224 |
| 8,657,685 B2* | 2/2014 | Gatto et al. | 463/42 |
| 8,683,075 B1* | 3/2014 | Joffe et al. | 709/238 |
| 8,886,930 B1* | 11/2014 | Thornewell et al. | 713/162 |
| 9,116,752 B1 | 8/2015 | Petit-Huguenin et al. | |
| 2002/0174247 A1 | 11/2002 | Shen | |
| 2003/0061315 A1 | 3/2003 | Jin | |
| 2003/0229697 A1* | 12/2003 | Borella | 709/226 |
| 2006/0045039 A1* | 3/2006 | Tsuneya et al. | 370/318 |
| 2007/0011301 A1 | 1/2007 | Ong et al. | |
| 2007/0268514 A1 | 11/2007 | Zeldin | |
| 2008/0133717 A1 | 6/2008 | Bouchat et al. | |
| 2008/0215668 A1 | 9/2008 | Hu | |
| 2009/0150977 A1 | 6/2009 | Carley | |
| 2009/0219820 A1 | 9/2009 | Acke et al. | |
| 2009/0292794 A1 | 11/2009 | Ding et al. | |
| 2010/0030875 A1* | 2/2010 | Visser et al. | 709/220 |
| 2010/0070625 A1* | 3/2010 | Flowerday et al. | 709/224 |
| 2010/0138921 A1* | 6/2010 | Na et al. | 726/22 |
| 2011/0271005 A1* | 11/2011 | Bharrat et al. | 709/232 |
| 2012/0166611 A1* | 6/2012 | Kim et al. | 709/223 |
| 2013/0054756 A1* | 2/2013 | Do | 709/219 |
| 2013/0077490 A1* | 3/2013 | Sela et al. | 370/235 |
| 2013/0103808 A1* | 4/2013 | Srinivasa et al. | 709/220 |

FOREIGN PATENT DOCUMENTS

| | | |
|---|---|---|
| EP | 1940077 A1 | 7/2008 |
| EP | 2015179 A1 | 1/2009 |
| EP | 2096793 A1 | 9/2009 |
| EP | 2106079 A1 | 9/2009 |
| EP | 2151950 A1 | 2/2010 |
| EP | 2106079 B1 | 12/2012 |
| WO | WO2009/101077 A1 | 8/2009 |

OTHER PUBLICATIONS

International PCT Search Report, PCT Application No. PCT/EP2011/054256, dated Oct. 12, 2011.

Charles E. Perkins, "Mobile IP: Design Principles and Practices" (1998), Addison Wesley, Reading (MA), ISBN 0-201-63469-4.

A.S. Tanenbaum, and D.J. Wetherall, "Computer Networks," 5th edition (2011), Pearson, Boston (MA), ISBN-13: 978-0-13-212695-3.

ServerWatch Tutorial, "Back to Basics: The DHCP Relay Agent" (Feb. 29, 2008) at http://www.serverwatch.com/tutorials/article.php/2193031.

Wimer, W., "Clarifications and extensions on the bootstrap protocol," RFC 1542, Internet Engineering Task Force (IETF) Standard, Oct. 1993, at http://www.ietf.org/rfc/rfc1542.txt.

"Definition of: Proxy Server," PC Magazine Encyclopedia, at http://www.pcmag.com/encyclopedia/term/49892/proxy-server, as of Jul. 29, 2014.

"Relay Channel," Wikipedia webpage, http://en.wikipedia.org/wiki/Relay_channel, 2014.

Thomas M. Cover and Abbas El Gamal, "Capacity theorems for the relay channel," IEEE Transactions on Information Theory (1979), pp. 572-584.

Kitamura, H., "A SOCKS-based IPv6/IPv4 Gateway Mechanism," RFC 3089, Internet Engineering Task Force (IETF) Standard, Apr. 2001, at http://www.ietf.org/rfc/rfc3089.txt.

"Application layer gateways and protocol translation," IBM Knowledge Center, at http://www 01.ibm.com/support/knowledgecenter/SSLTBW_2.1.0/com.ibm.zos.v2r1.hale001/ipv6d0021034306.htm as of Jul. 29, 2014.

"IP Details," Manual for Olicom CrossFire 8720 Fast Ethernet Switch (1999), at http://www.lard.net/olicom/CD_1.05/Help%20files/ipdetail.html, as of Jul. 29, 2014.

"SMTP Relay vs. forwarding," Oracle Community forum website Jan. 14, 2005, at http://www.lard.net/olicom/CD_1.05/Help%20files/ipdetail.html.

"CPE WAN Management Protocol," TR-069 amendment 4, Jul. 2011, at http://www.lard.net/olicom/CD_1.05/Help%20files/ipdetail.html.

Valcourt, Scott A., "DSL—From A to V and Back Again (Invited Paper)", Access Networks & Workshops, 2007, Accessnets '07, Second International Conference ON, IEEE, PI, Aug. 1, 2007, pp. 1-5.

DSLHome-Technical Working Group, "CPE WAN Management Protocol", Internet Citation, [Online], XP002316355, retrieved from the Internet: URL:http//www.dslforum.org/aboutdsl/Technical_Reports/TR-069.pdf, Chapter 11, retrieved on Feb. 4, 2005, pp. 91-109.

The DSL Home Technical Working Group in DSL Forum, TR-069 Amendment 1, the CPE WAN Management Protocol(Nov. 2006).

"Digital cellular telecommunications system (Phase 2+); General Packet Radio Services (GPRS); Service description; Stage 2," ETSI GSM 03.60 version 7.4.1 Release 1998.

"Portable Profiles for Residential Gateways," Mario Ibanez, Juan J. Sanchez, Natividad Martinez, and Ralf Seepold, 2006 International Workshop on Intelligent Solutions in Embedded Systems, IEEE, Jun. 30, 2006.

GPRS General Packet Radio Service, Regis Bates, McGraw-Hill, 2002.

\* cited by examiner

SYSTEM AND METHOD FOR HANDLING A CONFIGURATION REQUEST

CROSS REFERENCE TO RELATED APPLICATIONS

The present application is a national stage entry of PCT/EP2011/054256, filed Mar. 21, 2011, and claims priority to EP 10157252.7, filed Mar. 22, 2010. The full disclosures of EP 10157252.7 and PCT/EP2011/054256 are incorporated herein by reference.

FIELD OF THE INVENTION

The present invention relates to a system and a method for handling a configuration request. The invention further relates to a device for managing selection of an auto-configuration server. The invention further relates to a system in a local area network for providing a configuration request to be handled by a system for handling a configuration request or a device for managing the selection of an auto-configuration server. Finally, the invention relates to a computer readable medium for performing, when executed by a processor, a method for handling a configuration request.

BACKGROUND OF THE INVENTION

Digital communication is well established by virtue of the Internet protocol (IP) that allows an electronic device to communicate to other electronic devices over a potentially worldwide network. In such a network, the electronic device, often referred to as Customer Premises equipment (CPE), is typically coupled to the wide area network (WAN) (e.g., over a digital subscriber line DSL), either directly or via a local area network (LAN).

CPE may be any type of electronic device capable of digital communication. For example, it may be a personal computer, a gateway or router, an electronic appliance such as a set-top box, a television set, an IP based telephone, etc. Many CPE devices allow remote management over the wide area network, which relates to auto-configuration and dynamic service provisioning, software management, status and performance monitoring and diagnostics. The DSL Home-Technical Working Group describes in DSL Forum (Recently, DSL-Forum has been renamed to BroadBand-Forum), TR-069 amendment 1, the CPE WAN management protocol (November 2006), an end-to-end architecture for remote device management. In this architecture, a CPE device in a local network connects to an auto-configuration server (ACS) that is capable of providing service level settings for services available to the CPE.

Typically, an ACS is dedicated either to a certain level of services (e.g. premium, best effort), a type of device (e.g. Home Gateway, Voice over IP telephone, set top box) or a specific customer group (e.g. business or residential). For that reason, it is adversely required that each CPE must be pre-configured before installation at the location of the customer to specifically address the proper ACS in dependence of the combination of options above available to the customer. Furthermore, a system of multiple ACSs may be used for flexibility or to improve robustness by introducing an element of redundancy into a system. To address the proper ACS, it will be required to pre-program the CPE with either a specific IP address or a specific URL (Uniform Resource Locator) for the dedicated ACS. However, correct information for the CPE may be held on multiple ACSs. Alternatively configuration of the CPE may be done during installation either by service personnel or by the customer, but this may be time-consuming and/or may be sensitive to errors and mistakes.

SUMMARY OF THE INVENTION

It is an object of the present invention to provide a system, device and method, as described in the claims, that overcomes or reduces the problems of the prior art. For this purpose, the invention relates to a system for handling a configuration request, the system, situated in a wide area network, comprising a plurality of auto-configuration servers; and an auto-configuration server management device communicatively coupled to the plurality of auto-configuration servers; wherein the auto-configuration server management device is arranged for communication over the wide area network with a manageable electronic device, and wherein the auto-configuration server management device is arranged for: receiving the configuration request from the manageable electronic device; identifying one or more auto-configuration servers from the plurality of auto-configuration serves that can handle the configuration request; analyzing the load of the one or more identified auto-configuration servers; and selecting an auto-configuration server as destination address for the configuration request based on the load analysis of the one or more identified auto-configuration servers. The identification of the auto-configuration servers, which is where the configuration data may be held, and the load analysis of the different auto-configuration servers by the auto-configuration server management device with furthermore a selection based on this analysis can considerably improve the efficiency of handling of a configuration request because the auto-configuration server management device makes a selection between different auto-configuration servers based on their load. The result of this is that fewer configuration requests will form part of a queue, and this results in a quicker or more swift handling of the configuration requests. Furthermore the risk of excessive waiting for the handling of a particular configuration request reduces because the auto-configuration server management device may choose to request the configuration data from an ACS with a lower load. This is particularly advantageous if a CPE has been pre-configured with a single address for auto-configuration data and the ACS where that address is held suffers a high load at the instance when the CPE makes the original auto-configuration request. Furthermore, the use of load balancing may help to prevent congestion of configuration requests within the network. The reliability of the network can therefore improve as well.

In a further embodiment the system includes at least one database to which the auto-configuration server management device is communicatively coupled and wherein the auto-configuration server management device is arranged to determine an identification of the manageable electronic device by comparing the configuration request with information for identification of manageable electronic devices stored in the at least one database. In this embodiment the auto-configuration server management device is arranged to identify the one or more auto-configuration servers from the plurality of auto-configuration servers that can handle the configuration request based on the identification of the manageable electronic device.

The identification of the manageable device allows the auto-configuration server management device to identify, from information held about the manageable device in the at least one database, which other auto-configuration servers may hold the relevant configuration data for that specific manageable device. This allows for a manageable device to be pre-configured with only one address for auto-configuration data, while allowing for the configuration data to be downloaded from one of several possible servers where that data may also be held. The data which allows the auto-configuration server management device to identify the one or more auto-configuration servers is also held in the at least one database. In this embodiment a manageable electronic device, or customer premises equipment, may be programmed with only one address, for simplicity, but may efficiently receive the correct auto-configuration data when it is subsequently connected even if there have been further developments, for example technical and software developments, and auto-configuration data is now held at a different address or several addresses, and/or on multiple auto-configuration servers.

In a further embodiment, for example where there is a further, or second, wide area network, the auto-configuration server management device is further arranged for communication with a further auto-configuration server (ACS4;ACS5) located outside the network in the further wide area network. This may occur, for example, across geophysical or geopolitical boundaries or when technological progress has resulted in an existing network being augmented by a second network based on different technology. In this embodiment the identifying, analyzing and selecting can be performed taking the further auto-configuration server into account. This measure allows for the applicability of the system to the configuration of a wider variety of manageable electronic devices. The further auto-configuration server may also be assigned to a specific vendor. As a result, configuration requests related to electronic devices that are only configurable via dedicated servers assigned to a specific vendor can be handled as well.

In some embodiments, the further auto-configuration server may be located in a network assigned to an operator different from the operator being assigned to the network in which the auto-configuration server manager is located. Configuration requests related to electronic devices that are only configurable via operators and/or service providers that are not active in the network in which the auto-configuration server manager is located, can be handled as well. Such network may also comprise an auto-configuration server management device to which the further auto-configuration server is communicatively coupled. The further auto-configuration server management device may be coupled to the auto-configuration server management device. This may improve the flexibility of the system as the addition and/or removal of auto-configuration servers within a network only needs to be provisioned in the server managers.

Some embodiments of the invention relate to a device for managing selection of an auto-configuration server, the device comprising a processor and at least one memory connected to the processor, wherein the device is arranged in a wide area network comprising a plurality of auto-configuration servers, and wherein the device is communicatively connected to the plurality of auto-configuration servers, the device further being arranged for communication over the network with a manageable electronic device, and arranged to receive the configuration request from the manageable electronic device; identify one or more auto-configuration servers from the plurality of auto-configuration serves that can handle the configuration request; analyze the load of the one or more identified auto-configuration servers; and select an auto-configuration server as destination address for the configuration request based on the load analysis of the one or more identified auto-configuration servers. The device allows for a load analysis of different auto-configuration servers and a subsequent selection based on this analysis. This load balancing and selection procedure can considerably improve the efficiency of configuration request handling as discussed earlier.

Some embodiments of the invention relate to a system in a local area network for providing a configuration request to be handled by a system as mentioned above or a device as mentioned above in a wide area network, the system comprising an interfacing device for communicatively connecting the local area network to the wide area network, a manageable electronic device and a local interface arranged for the input of information triggering the transmittal of a configuration request with respect to the manageable electronic device. The system allows for a controlled way to initiate configuration requests, and allows for the insertion of preferences that can influence the load balancing process. A user may provide an input related to a minimal threshold value that the auto-configuration server manager may use to decide whether or not a configuration request should be assigned to a specific auto-configuration server.

Some embodiments of the invention relate to a method for handling a configuration request in a system comprising a plurality of auto-configuration servers; and an auto-configuration server management device communicatively coupled to the plurality of auto-configuration servers; wherein the auto-configuration server management device is arranged for communication over a wide area network with a manageable electronic device, the method comprising: receiving the configuration request from the manageable electronic device; identifying one or more auto-configuration servers from the plurality of auto-configuration serves that can handle the configuration request; analyzing the load of the one or more identified auto-configuration servers; and selecting an auto-configuration server as destination address for the configuration request based on the load analysis of the one or more identified auto-configuration servers. In some embodiments, analyzing the load may include evaluating, for each of the one or more identified auto-configuration servers, the number of requests assigned for further handling, and comparing the evaluated number of requests per auto-configuration server with each other. In some other embodiments analyzing the load may include evaluating, for each of the one or more identified auto-configuration servers, the expected time needed to handle the assigned requests, and comparing the evaluated expected time per auto-configuration server with each other.

In some embodiments, selecting the auto-configuration server as destination address for the configuration request is further based on one or more preferences associated with the configuration request. Such preferences may relate to preferences of the operator of the network in which the server manager resides and/or preferences of the service provider and/or to which the manageable electronic device transmitting the configuration request relates. For example, if two auto-configuration servers are suitable, of which one auto-configuration server is busy, while the other is currently free to handle a configuration request, the latter auto-configuration server will probably be selected if no preferences come into play. However, in view of the preferences, the first auto-configuration server may be selected if the difference between the load conditions between these two auto-configuration servers is below a predetermined threshold value.

In some embodiments, the invention relates to a computer readable medium for performing, when executed by a processor, the method as discussed above.

Further embodiments are described in the claims.

BRIEF DESCRIPTION OF DRAWINGS

Embodiments will now be described, by way of example only, with reference to the accompanying schematic drawings in which corresponding reference symbols indicate corresponding parts, and in which.

DETAILED DESCRIPTION OF EMBODIMENTS

Figure 1:
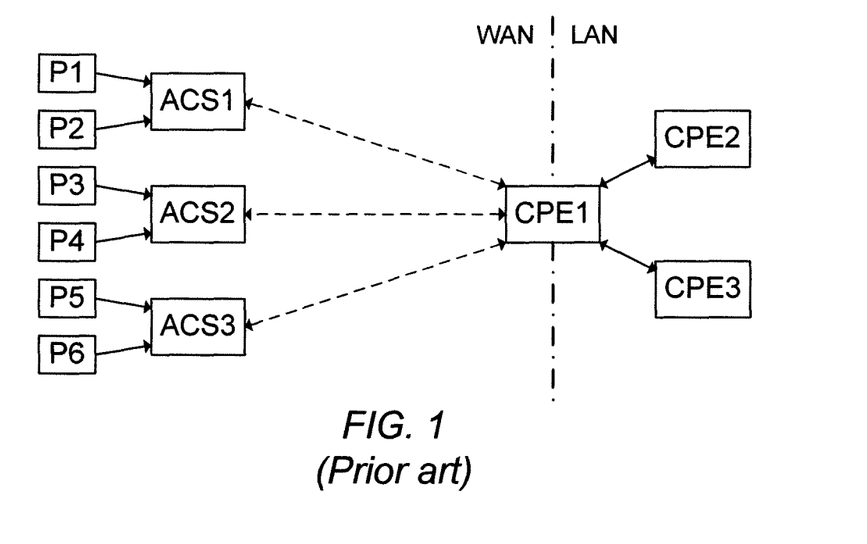
FIG. 1 schematically shows an end-to-end architecture for remote device management from the prior art.

FIG. 1 schematically shows an end-to-end architecture for remote device management from the prior art. The end-to-end architecture shown in FIG. 1 relates to a network arrangement comprising a local area network (LAN) coupled to a wide area network (WAN) through a home gateway or interfacing device CPE1, for example a router. The interfacing device may connect the LAN to the wide area network WAN over a connection device (not shown). The connection will often be implemented using digital subscriber line (DSL) technology, in which case the connection device may take the form of a DSL access multiplexer (DSLAM), which establishes a connection between the interfacing device CPE1 and a WAN network switch (not shown). The LAN is provided with electronic devices CPE2, and CPE3, which are in a communicative connection with the interfacing device CPE1.

The local area network LAN may be a home network or an office network, i.e., a network located at a specific geographic location. Also, the local area network LAN may be a logical network which is distributed over a number of geographic locations.

The wide area network WAN provides connectivity to a plurality of interfacing devices in a wide area. For example, the wide area network is the global network arrangement known as the Internet.

The types of manageable electronic devices like CPE1, CPE2, and CPE3 may include, but are not limited to Voice-over-Internet Protocol (VoIP) gateways, IP phones, network area storage devices, IP video streaming devices, television (TV) set top boxes, and interface devices like Wireless Fidelity (WiFi) routers, Asymmetric Digital Subscriber Line (ADSL) routers, Very high bit rate Digital Subscriber Line (VDSL) routers and fiber routers. Furthermore, personal area network devices for heating, ventilation, air conditioning, lighting, audio, video and security can be considered as type of manageable electronic devices.

The end-to-end architecture further comprises a plurality of auto-configuration servers ACS1, ACS2, ACS3. The auto-configuration servers ACS1, ACS2 and ACS3 connect over the wide area network WAN to the local area network LAN, schematically shown by a respective dashed arrow-line.

Configuration is understood to mean both configuration during initialization of a manageable electronic device as well as configuration related to amendments in configuration settings during the further lifetime of the electronic device. For example, a configuration request may be sent to update the settings of an electronic device. Such update may relate to an improvement of the service level of the electronic device or may extend the capability of such device.

The auto-configuration servers comprise configuration data to enable the configuration of electronic devices. In FIG. 1, the configuration data for auto-configuration servers ACS1, ACS2 and ACS3 are provided by provisioning systems P1 and P2, P3 and P4, P5 and P6 respectively. The provisioning systems P1 through P6 may provide configuration data that is one or more of equipment specific, service level specific and customer specific.

In the end-to-end architecture of FIG. 1, one or more of electronic devices CPE1, CPE2, and CPE3 are manageable electronic devices. The auto-configuration servers ACS1, ACS2, and ACS3 may comprise configuration data for a particular manageable electronic device. The first auto-configuration server ACS1 may comprise configuration data for a particular manageable electronic device, for example the interfacing device CPE1. The second and third auto-configuration servers ACS2, ACS3 may comprise configuration data for other particular manageable electronic devices, for example devices CPE2 and CPE3 respectively.

In the local area network LAN and the wide area network WAN, electronic devices are arranged to have an address for identification on the respective network. The communication with the electronic devices is then address based. A well known address scheme is the Internet Protocol address system that provides a so-called IP address to each electronic device coupled to the network. The methods for an electronic device to obtain an IP address for identification are known in the art.

The interfacing device CPE1, such as a router, may connect the local area network LAN to the wide area network WAN over a connection device. In many occasions, the connection will be implemented using digital subscriber line (DSL) technology, but in some embodiments of the present invention other alternative signal carriers capable of IP based communication such as optical fiber (e.g., fiber to the home, fiber to the curb), cable TV network(s), powerline or radio loops (e.g. UMTS) may be applied. In case of DSL technology, the interfacing device CPE1 may be coupled to a DSL access multiplexer (DSLAM, not shown), which establishes a connection between the interfacing device CPE1 and a WAN network switch (not shown).

The wide area network WAN may be provided with a domain name server (DNS, not shown) arranged for resolving domain name requests from the manageable electronic devices CPE1, CPE2, CPE3, or any additional electronic device used in the wide area network WAN.

Configuration of a manageable electronic device in the end-to-end architecture of FIG. 1 may work in the following way. Upon initialization of a new electronic device within the LAN, for example initialization of device CPE3, or the need for updating a configuration profile of an existing electronic device in the LAN, for example device CPE2, the respective manageable electronic device requires configuration data from an auto-configuration server dedicated to the level of service or to the type of manageable electronic device. In that event the manageable electronic device requests the configuration data from the respective dedicated auto-configuration server. If CPE2 or CPE3 requests the configuration data, the request is forwarded to the respective auto-configuration server through interfacing device CPE1. If CPE1 requests the configuration data, the request is directly made to the respective auto-configuration server over the wide area network WAN. In response to the request, the respective auto-configuration server then sends a message to the manageable electronic device containing the requested data.

The manageable electronic device sends a request to the address of the auto-configuration server. Such address may take the form of an IP address, but may also take a different form, e.g. the form of a uniform resource locator (URL). To enable a reliable transmission the specific address must be 'known' to the manageable electronic device before contacting the auto-configuration server. For this purpose, the specific address of the auto-configuration server is generally pre-configured for the manageable electronic device before installation at the local area network LAN, which may depend on one or more parameters chosen from at least the level of service, the type of the device, the type of access network and/or a costumer specific parameter. As a result, pre-configuration can be complex. Alternatively to pre-configuration of the CPE, configuration of the CPE may be done during installation either by service personnel or by the customer, but this may be time-consuming and/or may be sensitive to errors and mistakes.

For clarity, the architecture shown in FIG. 1 merely shows a single local area network LAN. In reality, many different local area networks may communicate with the same auto-configuration server. For example, all manageable electronic devices of the same type in a local area network LAN that communicates with the same wide area network WAN may request configuration data from the auto-configuration server dedicated to that specific type of electronic device. If too many devices request such configuration data simultaneously, the configuration of manageable electronic devices may be delayed. To avoid such delays, the dedicated auto-configuration server may be designed to be able to cope with maximum load conditions. As such conditions may not occur regularly, the resulting server may then occupy a relatively large space, and be relatively expensive.

The content of a configuration request may vary widely. In some cases, the configuration request will merely contain a request to provide addresses where the manageable electronic device can obtain the desired information. In other cases, the configuration request may include the request to download a codec and/or software, for example a new codec for Voice-over IP or mp5-software for a media player respectively.

Figure 2:
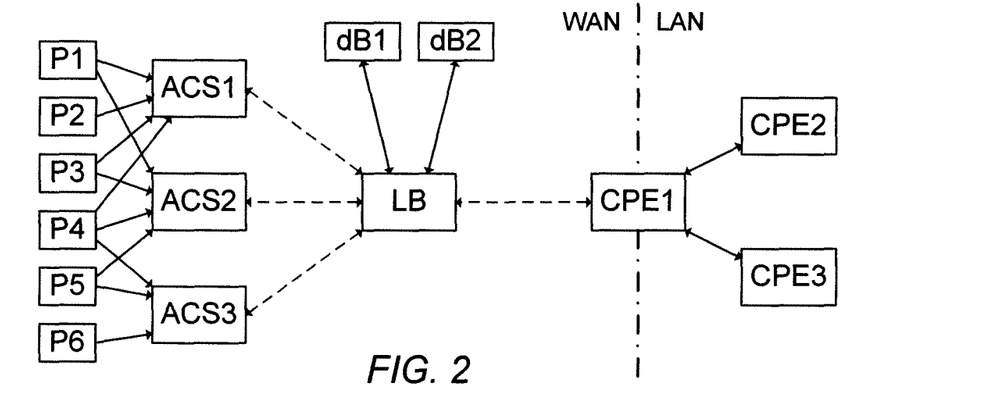
FIG. 2 schematically shows an architecture for remote device management in accordance with an embodiment of the invention.

FIG. 2 schematically shows an architecture for remote device management in accordance with an embodiment of the invention. In FIG. 2 entities with the same reference as shown in the FIG. 1 refer to corresponding entities. Although not discussed in detail, the coupling of the local area network LAN and the wide area network WAN can be performed in a way similar to the way described with reference to FIG. 1.

In contrast to the architecture shown in FIG. 1, within the wide area network WAN the architecture of FIG. 2 further comprises an auto-configuration server manager, or load balancer, LB. The auto-configuration server manager LB is arranged for controlling access to the auto-configuration servers ACS1, ACS2, ACS3 as is indicated by the dashed lines. The auto-configuration server manager is further communicatively coupled to the wide area network WAN, for example to a domain name server (DNS) provided therein. Such DNS may then be communicatively coupled via the WAN to a connection device such as a DSLAM which is used for in a way as discussed with reference to FIG. 1.

A DNS may serve the purpose of enabling the manageable electronic device to communicate with the auto-configuration server manager LB using a predefined and/or programmed URL in the manageable electronic device. When the electronic device is booted in the network that is assigned to a certain service provider, the service provider will generally load the domain name server (DNS) address into the manageable electronic device. The DNS comprises information that enables recognition of the predefined and/or programmed URL in the electronic device. The process of "solving" the URL may be performed at a suitable location in the wide-area network WAN or in the manageable electronic device.

Besides the auto-configuration server manager LB, the architecture of FIG. 2 in a further embodiment comprises databases dB1, dB2. Although two databases are shown, more databases may be used, or all databases may be merged into a single unit. The databases dB1, dB2 are communicatively coupled to the auto-configuration server manager LB. The databases may be located in one or more database servers, which may be located remotely from one another, as is known to persons skilled in the Art. The databases may be consulted by the auto-configuration server manager LB as will be described below in more detail.

The databases dB1, dB2 may contain information about manageable electronic devices and/or auto-configuration servers. In particular, the databases may contain information regarding what type of services can be executed by different electronic devices, and list what types of services can be handled by a specific auto-configuration server. Additionally, the databases may contain one or more of available IP addresses within the network, identities of service providers corresponding to IP addresses in the network, and addresses of auto-configuration servers. Furthermore, the databases dB1, dB2 may contain information to enable interpretation of configuration requests, as the format of such request may vary per provider and/or type of electronic device. Such information for interpreting may include translation tables for translating a configuration request into a format that can be treated. Furthermore, the interpreting information may comprise a list of identifiers to enable the identification of the type of configuration request, for example the format type.

While this embodiment uses a database, a database is not necessary to work the invention and there are alternative means by which the load balancer could find the information needed to identify the auto-configuration servers. For example, the information could be stored in a look-up table, known as an LUT, or the information could be transferred into the load balancer itself by means of a plug-in card.

The provisioning systems in the architecture of FIG. 2 are arranged differently as well. In contrast to the provisioning systems in the architecture of FIG. 1, the provisioning systems in FIG. 2 are arranged to provision different auto-configuration systems. Provisioning systems P2 and P6 still only provision a single auto-configuration system, i.e. ACS1 and ACS3 respectively. However, provisioning systems P1, P3, and P5 are arranged to provision two auto-configuration systems, while P4 is arranged to provision all three auto-configuration systems.

The auto-configuration server manager LB is communicatively coupled to the auto-configuration servers ACS1, ACS2, and ACS3. Protocols used for communication between the server manager LB and any one of the auto-configuration servers may include, but are not limited to HyperText Transfer Protocol (HTTP), HyperText Transfer Protocol Secure (HTTPS), Simple Object Access Protocol (SOAP) and a protocol using Extensible Markup Language (XML).

The auto-configuration server manager LB may control access to auto-configuration servers based on the content of a configuration request received from a manageable electronic device to be configured. The use of an auto-configuration server manager LB enables a reduction of the extent of pre-programming manageable electronic devices, as the target address for transmitting a configuration request may be the same address for all devices. Additionally, use may be made of local area network arrangements to relay the configuration request to the server manager LB as will be discussed below.

As different auto-configuration servers may comprise the same configuration data, e.g. because they are provisioned by the same provisioning system, more than one auto-configuration server may be able to handle a particular configuration request. For example, in FIG. 2, a configuration request containing a request for configuration with configuration data provided by provisioning system P3, may be handled by auto-configuration servers ACS1 and ACS2. Similarly, a request for configuration data originating from provisioning system P4, may be handled by all auto-configuration servers ACS1, ACS2, ACS3.

The auto-configuration server manager LB is now arranged to decide which auto-configuration server should handle a specific request. First of all, the auto-configuration server manager LB identifies which auto-configuration servers can handle the request, for example based on information obtained by consultation of one or more of the databases dB1, dB2. Then, the server manager LB balances the loads of the suitable auto-configuration servers, and selects the auto-configuration server with the best load conditions. The load balancing is performed on behalf of the manageable electronic device. For example, if a request relates to configuration data provisioned by provisioning system P1, the server manager LB can check the load of ACS1 and ACS2. If ACS1 has a lot of requests that need to be processed, while ACS2 is more readily available, the auto-configuration server manager LB will select ACS2 to handle the configuration request. The result of the load balancing performed on behalf of the manageable electronic device is that the device can be provided with auto-configuration data in a more efficient manner, irrelevant of the IP address of the used ACS.

Balancing the loads of different auto-configuration servers improves the efficiency of configuration request handling. Configuration requests can be handled more quickly. The average handling time of a configuration request may thus decrease and will generally become more predictable as well because of a reduced chance of excessive waiting. Furthermore, the use of load balancing may help to prevent congestion of configuration requests within the network. The reliability of the network may therefore improve as well.

Figure 3:
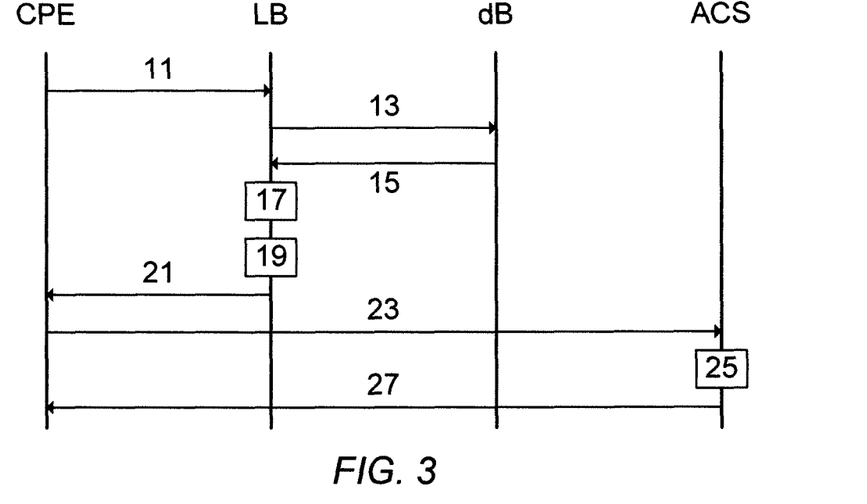
FIG. 3 shows a signal flow of a method of handling an exemplary configuration request in the architecture of FIG. 2.

FIG. 3 shows a signal flow of a method of handling a configuration request in the architecture of FIG. 2 to further clarify its operation. In the signal flow, entities are represented in a general sense, i.e. the electronic device to be configured is referred to as CPE, the one or more databases to be consulted is referred to as dB, and the auto-configuration server that is selected for providing configuration data is referred to as ACS. Further examples related to specific entities will be discussed below. Additionally, in this signal flow the assumption is made that the manageable electronic device to be configured is provided with the address, e.g. an IP-address or URL, of the auto-configuration server manager LB.

First in action 11, the manageable electronic device CPE sends a configuration request to the auto-configuration server manager LB. The configuration request comprises a request for configuration data from a suitable auto-configuration server as well as the address of the device CPE. The address of the device CPE will later be used to enable correct transmission of a response message. The configuration request may further comprise information regarding the type or function of the device CPE, as well as other additional information, for example the identity of the supplier and/or manufacturer of the device.

The address of the auto-configuration server manager LB, e.g. an IP-address or URL, may be preinstalled in manageable electronic device. Such address may also be programmed by a user.

Alternatively, a generic address could be preinstalled or programmed. In such a case, the address can be obtained by transmitting a request to a domain name server (DNS), also referred to as DNS-request, comprising the generic address. In response, the DNS then provides the address corresponding to the generic address. For example, if a generic URL like "deviceconfiguration.com" would have been preinstalled, the address of the auto-configuration server manager LB could be obtained via a DNS-request, and a connection with the auto-configuration server manager LB could be established for transmittal of the configuration request.

Another alternative to enable the manageable electronic device CPE to send a configuration request to the auto-configuration server manager LB would be to make use of a generic broadcast address. The generic broadcast address may relate to the network WAN to which the CPE is connected, for example some digits in the address may correspond to the identification number of this network. The generic broadcast address may be preinstalled or installed during setup. Upon initialization, or in case an update is needed, the electronic device CPE could be arranged to request transmittal of the configuration request to the generic broadcast address within the network it is connected to. A home gateway, e.g. a router like CPE1 in FIG. 2, may execute such request, and send the configuration request to the broadcast address in that network. The configuration request is then broadcasted in the network. The auto-configuration server manager LB within the network may be arranged to pick out configuration requests broadcasted within the network, perform its duties and may then send a configuration request response to the home gateway, which in its turn can relay the response to the electronic device CPE that requested configuration.

After receipt of the configuration request, the auto-configuration server manager LB, in a particular embodiment, consults the one or more databases dB in action 13. In response, the databases dB send the desired information to the server manager LB in action 15.

Although this action is represented by a single arrow, there may be several messages sent in parallel to different databases to acquire information with respect to several different aspects of the configuration request. For example, the auto-configuration server manager LB may compare the received address of the device CPE with a list of addresses in a database dB containing addresses that are valid for allowing access to the auto-configuration server manager LB. If the check reveals that the address is invalid, the auto-configuration server manager LB may send a message to the device CPE informing the device that the configuration request cannot be executed.

Alternatively, or additionally, consulting one or more databases dB may be performed to enable translation of the configuration request into a format the server manager LB can handle. With consultation of the one or more databases, the server manager LB may be able to identify the format of the configuration request, and then retrieve useful information from it, either directly or via one or more translations. Such translations may also be performed with help of one or more databases, for example by using translation tables.

Another additional and/or alternative action in which the auto-configuration server manager LB may consult the one or more databases, is to resolve information retrieved from the configuration request. Examples of such information includes, but are not limited to, an identity of the service provider related to the device, an identity of the type of services the device can perform, and information regarding conditions that may apply in view of the address of the device. Such information may be in a format known in the art, for example, the identity of the service provider may take the form of an internet service provide identity (ISPID).

Based on the one or more consultations of the one or more databases in actions 13, 15, the auto-configuration server manager LB then identifies in action 17 which auto-configuration servers are suitable for handling the configuration request, i.e. which auto-configuration servers support specific services, which auto-configuration servers are assigned to a specific provider, etc. In embodiments of the invention it is possible that more than one auto-configuration server contains the requested configuration data.

In action 19 the auto-configuration server manager LB analyzes the load of the suitable auto-configuration servers and selects the auto-configuration server ACS that should provide the configuration data in response to the configuration request.

The term "load" relates to the work load the auto-configuration server needs to process before it can handle the new configuration request. The work load may be defined in terms of the number of requests assigned to the auto-configuration server for further handling. Alternatively, the work load may be defined in terms of the expected time needed to handle the requests assigned to an auto-configuration server. The load conditions may be checked periodically for all auto-configuration servers in communicative connection with the server manager LB. Alternatively, the load condition of the identified auto-configuration servers is checked specifically.

The selection of the auto-configuration server ACS may be based on the load conditions alone, but may also include other considerations like preferences of the operator of the network in which the server manager LB resides and/or preferences of the service provider and/or to which the manageable electronic device transmitting the configuration request relates. For example, if two auto-configuration servers are suitable, of which one auto-configuration server is busy, while the other is currently free to handle a configuration request, the latter auto-configuration server may be selected. However, if the difference between the load conditions between these two auto-configuration servers is below a predetermined threshold value, the server manager may select the auto-configuration server based on operator and/or service provider preferences.

In some embodiments, the configuration request may comprise a auto-configuration selection code, which provides further information that may be used to influence the selection process performed by the auto-configuration server manager LB. For example, such code could provide further information to optimize the load analysis, like the predetermined threshold value mentioned above.

Alternatively, such auto-configuration selection code could provide information for temporary configuration of the CPE for special purposes, for example to facilitate an electronic payment function. The auto-configuration selection code could instruct the auto-configuration server manager LB to redirect the configuration request to a specific type of auto-configuration server, for example an auto-configuration server arranged for providing suitable configuration data for electronic payment, i.e. data that enable the CPE to create a secure connection and/or get access to a secure environment. Disconnection of such secure connection may be executed after the lapse of a predetermined time period or may be obtained by transmittal of follow-up configuration request.

Offering the auto-configuration selection code may trigger the transmittal of a configuration request comprising the code. The auto-configuration selection code may be provided via a local interface, for example via a browser.

After selection of the suitable server ACS, the auto-configuration server manager LB sends a first configuration request response message to the electronic device CPE in action 21. The first configuration response at least comprises the address of the selected auto-configuration server ACS. The address of the selected auto-configuration server ACS may be obtained by consultation of a database, for example in actions 13, 15. Alternatively, the addresses of the auto-configuration servers that are communicatively coupled to the server manager LB are stored in a memory that is accessible by the server manager LB. The address of the auto-configuration servers may take the form of an IP-address, an URL or any other format known to the person skilled in the art.

Apart from the address of the selected auto-configuration server ACS, the first configuration request response message may further include redirection instructions for the manageable electronic device CPE to retransmit the configuration request to the address of the selected auto-configuration server ACS. The electronic device CPE is thus told to retransmit its configuration request to the address of the selected server ACS. The redirection instructions may be provided by means of a function in a known protocol, for example the HyperText Transfer Protocol (HTTP) redirect function.

Next, the manageable electronic device CPE re-transmits the configuration request to the address of the selected auto-configuration server ACS in action 23. The selected auto-configuration server ACS receives this request, and retrieves the requested configuration data in action 25. Finally, the selected auto-configuration server ACS transmits a second configuration request response message to the electronic device CPE in action 27. The second configuration request response message at least comprises the configuration data requested by the electronic device CPE.

Figure 4:
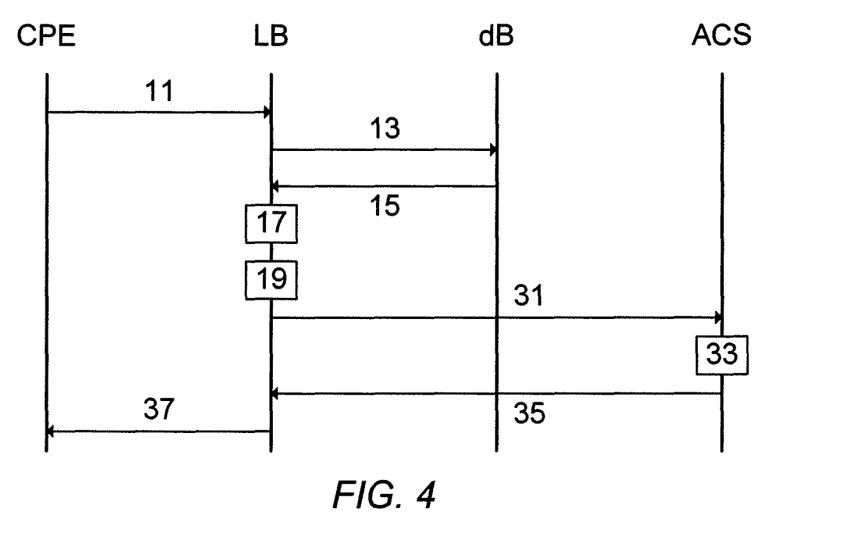
FIG. 4 shows another signal flow of a method of handling an exemplary configuration request in the architecture of FIG. 2.

FIG. 4 shows another signal flow of a method of handling an exemplary configuration request in the architecture of FIG. 2. In FIG. 4 actions with the same reference number as shown in the FIG. 3 refer to corresponding actions.

In the signal flow shown in the embodiment of FIG. 4 actions 11-19 are identical to the actions described with reference to FIG. 3. However, instead of sending a first configuration request message to the electronic device CPE, the auto-configuration server manager LB now relays the configuration request to the selected auto-configuration server ACS in action 31. The signal flow shown in FIG. 4 has the advantage that the auto-configuration server manager LB is involved in all actions, which allows for complete monitoring of the configuration process.

Upon receipt of the configuration request, the selected auto-configuration server ACS retrieves the requested configuration data in action 33. Subsequently, the selected auto-configuration server ACS transmits a configuration request response message to the server manager LB in action 35. The configuration request response message at least comprises the configuration data requested by the manageable electronic device CPE. Finally, the auto-configuration server manager LB relays the configuration request response message to the device CPE in action 37.

In yet another alternative signal flow (not shown), instead of transmitting the configuration request response message via the auto-configuration server manager LB, the response message is sent to the manageable electronic device CPE directly. The selected auto-configuration server ACS may use address information in the configuration request to obtain the address of the electronic device CPE.

The person skilled in the art will appreciate that any manageable electronic device CPE residing in the local network LAN can have access to any electronic device in the wide area network WAN through an interfacing device like CPE1 in FIG. 2, for example through the concept of network address translation (NAT).

Figure 5:
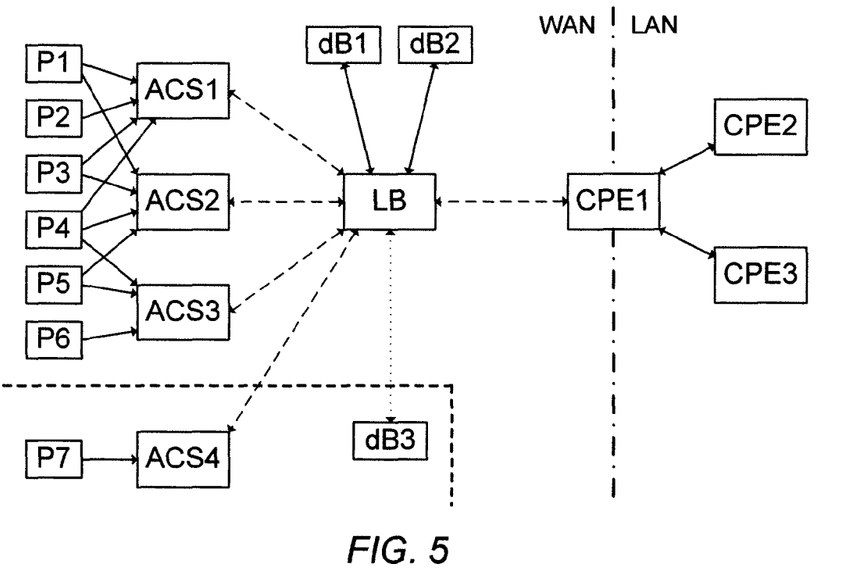
FIG. 5 schematically shows an architecture for remote device management in accordance with another embodiment of the invention.

FIG. 5 schematically shows an architecture for remote device management in accordance with another embodiment of the invention. In FIG. 5 entities with the same reference as shown in the FIG. 2 refer to corresponding entities.

The architecture of FIG. 5 further comprises an additional auto-configuration server ACS4. This server ACS4 is a server dedicated to manageable electronic devices of a specific vendor, and may be located in a vendor-specific network which may be a local area network or a wide area network, as will be appreciated by the skilled person. The server ACS4 may be provisioned with configuration data via a dedicated provisioning system P7.

The auto-configuration server manager LB is communicatively connected to the auto-configuration server ACS4. Knowledge with respect to its content may be stored in databases dB1, dB2. Optionally, the auto-configuration server manager LB is also communicatively connected with an additional database dB3 that is dedicated to the same specific vendor. For clarity, in FIG. 5, all entities solely related to this specific vendor are separated from the other entities in the architecture by a dashed line without arrows.

In the architecture of FIG. 5, the server manager LB has the possibility to select the vendor-specific server ACS4 if it receives a configuration request from a manageable electronic device of that specific vendor. Furthermore, the auto-configuration servers installed within a network of an operator and/or service provider do not necessarily need to be provisioned with configuration data of electronic devices that are available in the market place. Instead, the servers may comprise configuration data related to a selection of electronic devices, while other electronic devices can still operate within the network, but may be provided with configuration data from a server located outside the network. As a result, many more devices can be configured within the network without the need of expanding the capacity of the auto-configuration servers located therein.

Figure 6:
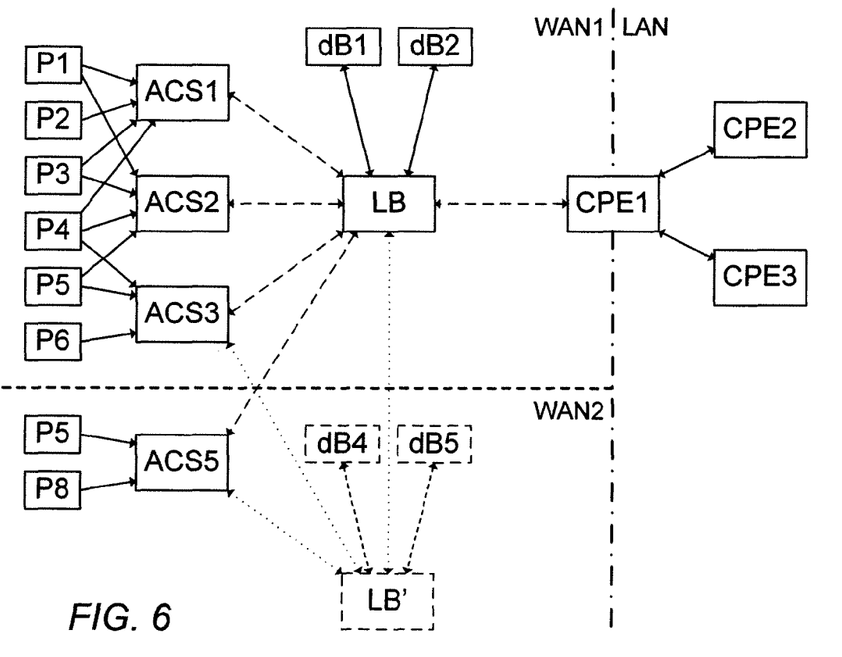
FIG. 6 schematically shows an architecture for remote device management in accordance with yet another embodiment of the invention.

FIG. 6 schematically shows an architecture for remote device management in accordance with yet another embodiment of the invention. In FIG. 6 entities with the same reference as shown in the FIGS. 2 and 5 refer to corresponding entities.

The components already shown in FIG. 2 are all part of a first network WAN1, which is operated by a first operator. The architecture of FIG. 6 further comprises a second wide-area network WAN2, which is operated by a second operator.

The second network WAN2 comprising at least one auto-configuration server ACS5. The server ACS5 may comprise configuration data that is also available within the first wide-area network WAN1, for example configuration data that may be provisioned by provisioning system P5. However, the auto-configuration server ACS5 in the second network WAN2 may also comprise configuration data that is not available in the first network WAN1, for example configuration data that may be provisioned by provisioning system P8. The auto-configuration server manager LB may be communicatively coupled to the auto-configuration server ACS5.

The second wide-area network WAN2 may further comprise a further auto-configuration server manager LB' that is communicatively coupled to server ACS5. Additionally, the further server manager LB' may be communicatively coupled to one or more databases dB4, dB5. The function of the databases dB4, dB5, and the further auto-configuration server manager LB' may be the same as the function of similar entities dB1, dB2, and LB in the first network WAN1. In case the server manager LB in the first network WAN1 is coupled to the further server manager LB' in the second network WAN2, communicative connection between the server manager LB and the auto-configuration server ACS5 may be established via the further server manager LB'.

In the end-to-end architecture of FIG. 6, the auto-configuration server manager LB has the option to select the auto-configuration server ACS5 in the second network WAN2 if this server is the only or the best server for further handling of that request. So, in this architecture, the auto-configuration servers installed within the first network do not necessarily need to be provisioned with configuration data of electronic devices that are arranged to operate on the basis of configuration data related to the second network. This greatly improves the flexibility of device configuration.

As will be understood by a person skilled in the art, it may be envisioned to design an end-to-end architecture that makes use of the configurations shown in FIG. 5 and FIG. 6. In such case, the auto-configuration server manager LB may be communicatively coupled to one or more vendor-specific network components or networks as well as to one or more wide area networks operated by different operators. Such end-to-end architecture enables efficient configuration of many manageable electronic devices without being obstructed by vendor-specific and/or operator-related restrictions.

The present invention which will be now illustrated by the following Examples, which should not be considered as limiting the claims.

EXAMPLES

Example 1

The manageable electronic device to be configured is device CPE1, which is a router. Configuration data related to this router are provisioned by provisioning system P1.

Following the method as described with reference to FIG. 3 or 4, the auto-configuration server manager LB will identify auto-configuration servers ACS1 and ACS2 as suitable servers, as these servers comprise the configuration data requested by CPE1. Based on a load balancing action, the server manager LB decides whether ACS1 or ACS2 handles the configuration request. The configuration request can be handled by the architectures of FIG. 2, FIG. 5 and FIG. 6.

Example 2

The manageable electronic device to be configured is device CPE2, which is a VoIP-phone compliant with the wide area network to which the local area network in which CPE2 resides directly connects. Configuration data related to this VoIP-phone are provisioned by provisioning system P4.

Following the method as described with reference to FIG. 3 or 4, the auto-configuration server manager LB will identify auto-configuration servers ACS1, ACS2 and ACS3 as suitable servers, as these servers comprise the configuration data requested by CPE2. Based on a load balancing action, the server manager LB decides whether ACS1, ACS2 or ACS3 handles the configuration request. The configuration request can be handled by the architectures of FIG. 2, FIG. 5 and FIG. 6.

Example 3

The manageable electronic device to be configured is device CPE3, which is an audio device, for example an MP3-player, of a specific vendor. Configuration data related to this audio device are provisioned by provisioning system P6.

Following the method as described with reference to FIG. 3 or 4, the auto-configuration server manager LB will identify auto-configuration server ACS3 as the server that should handle the configuration request, as this server is the only server that comprises the configuration data requested by CPE3. The configuration request can be handled by the architectures of FIG. 2, FIG. 5 and FIG. 6.

Example 4

The manageable electronic device to be configured is device CPE3, which is an audio device, for example an MP3-player, of a specific vendor. This specific vendor is a different vendor than the one in Example 3. Configuration data related to this audio device are provisioned by provisioning system P7.

Following the method as described with reference to FIG. 3 or 4, the auto-configuration server manager LB can only identify a suitable auto-configuration server if it has a communicative connection to a server comprising the requested data. In the architecture shown in FIG. 5, the auto-configuration server manager LB will thus identify ACS4 as the server that should handle the configuration request, as this server is the only server that comprises the configuration data requested by CPE3. However, in the architectures of FIGS. 2 and 6, the auto-configuration server manager LB cannot find a suitable auto-configuration server. Neither one of ACS1, ACS2, ACS3 (FIG. 2) and ACS5 (FIG. 6) comprise configuration data provisioned by provisioning system P7. Therefore, in these embodiments, the server manager LB will transmit a response message to CPE3 that the configuration request cannot be executed.

Example 5

The manageable electronic device to be configured is device CPE2, which is a VoIP-phone compliant with a wide area network of a different operator than the wide area network to which the local area network in which CPE2 resides directly connects. Configuration data related to this VoIP-phone are provisioned by provisioning system P8.

Following the method as described with reference to FIG. 3 or 4, the auto-configuration server manager LB can only identify a suitable auto-configuration server if it has a communicative connection to a server comprising the requested data, either directly or indirectly. In the architecture shown in FIG. 6, the auto-configuration server manager LB will thus identify ACS5 as the server that should handle the configuration request. This server is the only server that comprises the configuration data requested by CPE2.

In the architecture of FIG. 6, ACS5 can either be detected directly or indirectly via the auto-configuration server manager LB' in the network of the different operator. However, in the architectures of FIGS. 2 and 5, the auto-configuration server manager LB cannot find a suitable auto-configuration server. Neither one of ACS1, ACS2, ACS3 (FIG. 2) and ACS4 (FIG. 5) comprise configuration data provisioned by provisioning system P8. Therefore, in these embodiments, the server manager LB will transmit a response message to CPE2 that the configuration request cannot be executed.

Example 6

The manageable electronic device to be configured is device CPE3, which is an audio device, for example an MP3-player, of a specific vendor. This specific vendor is a different vendor than the one in Examples 3 and 4. Configuration data related to this audio device are provisioned by provisioning system P5.

Following the method as described with reference to FIG. 3 or 4, the auto-configuration server manager LB in the architectures of FIG. 2 and FIG. 5 will identify auto-configuration server ACS3 as the server that should handle the configuration request. In these architectures, server ACS3 is the only server that comprises the configuration data requested by CPE3.

However, in the architecture of FIG. 6, the auto-configuration server manager LB will also identify auto-configuration server ACS5 as a suitable server. Based on a load balancing action, the server manager LB may decide whether ACS3 or ACS5 should handle the configuration request. However, the service provider or operator may decide that the handling of configuration requests is preferably handled by auto-configuration servers in his network, i.e. WAN1. In such case, the auto-configuration server manager may select ACS3 to handle the configuration request.

Figure 7:
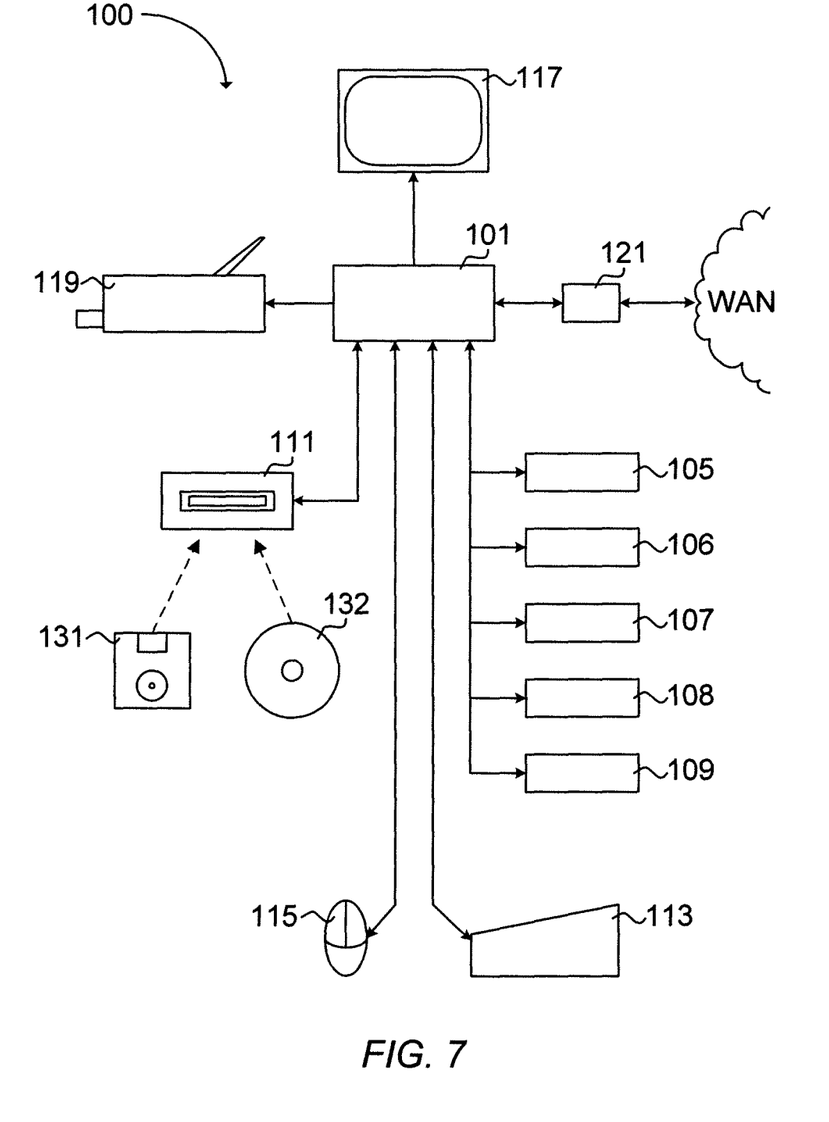
FIG. 7 shows an embodiment of an auto-configuration server manager.

FIG. 7 shows an embodiment of the auto-configuration server manager LB. The auto-configuration server manager LB may be implemented as a computer system 100. The computer system 100 comprises a processor 101 with peripherals. The processor 101 is connected to memory units 105, 106, 107, 108, 109 which are arranged for storing instructions and data, one or more reading units 111 (to read, e.g., floppy disks 131, CD ROM's 132, DVD's, portable memory card devices, etc.), a keyboard 113 and a mouse 115 as input devices, and as output devices, a monitor 117 and a printer 119. Other input devices as well as other output devices may be provided.

Further, a network Input/Output (I/O) device 132 is provided for a connection to the network WAN. Other components of the computer system may be arranged on the network WAN.

The memory units shown comprise Random Access Memory (RAM) 105, (Electrically) Erasable Programmable Read-Only Memory ((E)EPROM) 106, Read-Only Memory (ROM) 107, tape unit 108, and hard disk 109. However, it should be understood that there may be provided more and/or other memory units known to persons skilled in the art. Moreover, one or more of them may be physically located remote from the processor 101, if required.

The processor 101 is shown as one box, however, it may comprise several processing units functioning in parallel or controlled by one main processor, that may be located remotely from one another, possibly distributed over the wide area network WAN, as is known to persons skilled in the art.

The processor 101 comprises functionality either in hardware or software components to carry out respective functions for the implementation of the method of the present invention.

Skilled persons will appreciate that the functionality of the present invention may be accomplished by a combination of hardware and software components. Hardware components, either analogue or digital, may be present within the processor 101 or may be present as separate circuits which are interfaced with the processor 101. Further it will be appreciated by persons skilled in the art that software components that are executable by the processor may be present in a memory region of the processor 101.

The computer system 100 shown in FIG. 7 is arranged for performing computations in accordance with some embodiments of the method of the present invention. Some embodiments of the present invention may relate to a computer program on a computer readable medium, which computer program implements an embodiment of the method of the present invention. The computer system 100 is capable of executing the computer program (or corresponding program code or instructions) to carry out some embodiments of the method of the present invention after loading the computer program from the computer readable medium into the computer system.

It is noted that the present invention is not limited to providing configuration data to a manageable electronic device for a certain level of service, but the present invention may also be used for support provided by manufacturers of electronic equipment over the wide area network. For example, the present invention may be used as a service for networkable consumer electronics to provide software upgrades or diagnostics through a default configuration address (that may be valid in any location of the global Internet). In this case the configuration request additionally comprises an identification of the supplier and/or an identification of the type of product. In this embodiment, the auto-configuration server manager LB is capable to determine suitable auto-configuration servers based on at least one of the identification of the supplier and the identification of the type of product.

It will be apparent to the person skilled in the art that other alternative and equivalent embodiments of the invention can be conceived and reduced to practice without departing from the spirit of the invention, the scope of the invention being limited only by the appended claims.

Abbreviations

ACS: Auto-configuration Server
CD ROM: Compact Disc Read-Only Memory
CPE: Customer premises equipment
DNS: Domain name server
DSL: Digital Subscriber Line
DSLAM: DSL Access Multiplexer
DVD: Digital Video Disc
(E)EPROM: (Electrically) Erasable Programmable Read-Only Memory
HTTP: HyperText Transfer Protocol
HTTPS: HyperText Transfer Protocol Secure
I/O: Input/Output
IP: Internet Protocol
ISP: Internet Service Provider
LAN: Local Area Network
LB: Load Balancer
RAM: Random Access Memory
ROM: Read-Only Memory
SOAP: Simple Object Access Protocol
URL: Uniform Resource Locator
WAN: Wide Area Network
XML: Extensible Markup Language

The invention claimed is:

1. A system, in a wide area network, for handling a configuration request, the system comprising:

a plurality of auto-configuration servers; and
an auto-configuration server management device communicatively coupled to the plurality of auto-configuration servers;
wherein the auto-configuration server management device is configured for communication over the wide area network with a manageable electronic device, and wherein the auto-configuration server management device is configured to:
(i) receive the configuration request from the manageable electronic device;
(ii) identify two or more auto-configuration servers from the plurality of auto-configuration servers that can handle the configuration request;
(iii) analyze the load of the two or more identified auto-configuration servers, wherein analyzing the load comprises evaluating, for each of the two or more identified auto-configuration servers, a work load to be processed before further handling the configuration request, and comparing the work load per auto-configuration server with each other;
and
(iv) select an auto-configuration server as destination address for the configuration request based on the load analysis of the two or more identified auto-configuration servers.

2. The system of claim 1, further comprising:
at least one database; and wherein
the auto-configuration server management device is communicatively coupled to the at least one database; and
the auto-configuration server management device is configured to determine an identification of the manageable electronic device by comparing the configuration request with information for identification of manageable electronic devices stored in the at least one database; and wherein the auto-configuration server management device is further configured to:
identify the two or more auto-configuration servers from the plurality of auto-configuration servers that can handle the configuration request based on the identifications of the manageable electronic device.

3. The system of claim 1, wherein there is a further wide area network and wherein the auto-configuration server management device is further configured for communication with a further auto-configuration server located in the further wide area network, and wherein the auto-configuration server management device is configured to perform the identifying, analyzing and selecting taking the further auto-configuration servers into account.

4. The system of claim 3, wherein the further auto-configuration server is a server assigned to a specific vendor.

5. The system of claim 3, wherein the network is assigned to a first operator, and wherein the further auto-configuration server is located in a network assigned to a second operator.

6. The system of claim 5, wherein the auto-configuration server management device is communicatively coupled to a further auto-configuration server management device in the network assigned to the second operator, and wherein the further auto-configuration server management device is communicatively coupled to the further auto-configuration server.

7. A device for managing selection of an auto-configuration server, the device comprising:
a processor and at least one memory connected to the processor, wherein the device is arranged in a wide area network comprising a plurality of auto-configuration servers, and wherein the device is communicatively connected to the plurality of auto-configuration servers, the device further being arranged for communication over the network with a manageable electronic device, and configured to:
- (i) receive the configuration request from the manageable electronic device;
- (ii) identify two or more auto-configuration servers from the plurality of auto-configuration serves that can handle the configuration request;
- (iii) analyze the load of the two or more identified auto-configuration servers, wherein analyzing the load comprises evaluating, for each of the two or more identified auto-configuration servers, a work load to be processed before further handling the configuration request, and comparing the work load per auto-configuration server with each other; and
- (iv) select an auto-configuration server as destination address for the configuration request based on the load analysis of the two or more identified auto-configuration servers.

8. The device of claim 7, wherein the device is further communicatively coupled to at least one database and configured to determine an identification of the manageable electronic device by comparing the configuration request with information for identification of manageable electronic devices stored in the at least one database, and further wherein the identification of the two or more auto-configuration servers is based on the identification of the manageable electronic device.

9. The system according to claim 1 further comprising:
a local area network; and
an interfacing device for communicatively connecting the local area network to the wide area network, the manageable electronic device and a local interface configured for the input of information triggering the transmittal of a configuration request with respect to the manageable electronic device.

10. A method for handling a configuration request in a system comprising (i) a plurality of auto-configuration servers; and (ii) an auto-configuration server management device communicatively coupled to the plurality of auto-configuration servers, wherein the auto-configuration server management device is arranged for communication over a wide area network with manageable electronic device, the method comprising:
receiving the configuration request from the manageable electronic device;
identifying two or more auto-configuration servers from the plurality of auto-configuration serves that can handle the configuration request;
analyzing the load of the two or more identified auto-configuration servers, wherein analyzing the load comprises evaluating, for each of the two or more identified auto-configuration servers, a work load to be processed before further handling the configuration request, and comparing the work load per auto-configuration server with each other; and
selecting an auto-configuration server as destination address for the configuration request based on the load analysis of the two or more identified auto-configuration servers.

11. The method of claim 10, wherein the auto-configuration server management device is communicatively coupled to at least one database and wherein the method further comprises:
determining an identification of the manageable electronic device by comparing the configuration request with information for identification of manageable electronic devices stored in the at least one database; and
identifying the two or more auto-configuration servers from the plurality of auto-configuration serves that can handle the configuration request based on the identification of the manageable electronic device.

12. The method of claim 10, wherein a workload to be processed is defined in terms of a number of requests assigned for further handling.

13. The method of claim 10, wherein a workload to be processed is defined in terms of an expected time needed to handle a number of requests assigned for further handling.

14. The method of claim 10, wherein selecting the auto-configuration server as destination address for the configuration request is further based on one or more preferences associated with the configuration request.

15. The method of claim 14, wherein selecting the auto-configuration server as destination address is further based on an auto-configuration server selection code that is part of the configuration request.

16. A non-transitory computer readable medium having instructions stored thereon that, when executed by a processor of a system, cause the system to carry out functions for handling a configuration request in the system, wherein the system comprises (i) a plurality of auto-configuration servers; and (ii) an auto-configuration server management device communicatively coupled to the plurality of auto-configuration servers, wherein the auto-configuration server management device is arranged for communication over a wide area network with manageable electronic device, and wherein the functions include:
receiving the configuration request from the manageable electronic device;
identifying two or more auto-configuration servers from the plurality of auto-configuration serves that can handle the configuration request;
analyzing the load of the two or more identified auto-configuration servers,
wherein analyzing the load comprises evaluating, for each of the two or more identified auto-configuration servers, a work load to be processed before further handling the configuration request, and comparing the work load per auto-configuration server with each other; and
selecting an auto-configuration server as destination address for the configuration request based on the load analysis of the two or more identified auto-configuration servers.

* * * * *